United States Patent
Snape

(10) Patent No.: US 6,870,922 B1
(45) Date of Patent: Mar. 22, 2005

(54) OVERLOAD PREVENTION IN AN INTELLIGENT NETWORK

(75) Inventor: Thomas J Snape, Blandford Forum (GB)

(73) Assignee: Marconi UK Intellectual Property, Ltd., Coventry (GB)

( * ) Notice: Subject to any disclaimer, the term of this patent is extended or adjusted under 35 U.S.C. 154(b) by 0 days.

(21) Appl. No.: 09/600,771

(22) PCT Filed: Feb. 5, 1999

(86) PCT No.: PCT/GB99/00375
§ 371 (c)(1), (2), (4) Date: Sep. 7, 2000

(87) PCT Pub. No.: WO99/40737
PCT Pub. Date: Aug. 12, 1999

(30) Foreign Application Priority Data

Feb. 6, 1998 (GB) ............................................. 9802692

(51) Int. Cl.[7] .............................................. H04M 7/00
(52) U.S. Cl. ........................ 379/221.12; 379/221.04; 379/221.14; 370/236
(58) Field of Search ...................... 379/112.04, 220.01, 379/221.03, 221.04, 88.14, 221.09, 221.08–221.12, 221.14, 133; 370/236, 252; 455/414.1

(56) References Cited

U.S. PATENT DOCUMENTS 5,838,768 A * 11/1998 Sumar et al. ............. 379/88.14
6,222,826 B1 * 4/2001 Faynberg et al. ........... 370/252
6,341,162 B1 * 1/2002 Kelly et al. ............. 379/221.09

FOREIGN PATENT DOCUMENTS

EP  0 735 786 a2  3/1996
WO  WO 96/15634  5/1996

OTHER PUBLICATIONS

Jeong et al., "Effective Overload Prevention and Control for Traffic Management in Intelligent Network", Jan., 01, 1996, International Conference on Intelligence in Networks, XP–002067129, pp. 229–234.*
Jeong, K., et al.: *Effective Overload Prevention and Control for Traffic Management in Intelligent Network,* International Conference on Intelligence in Networks, Jan. 1, 1996, pp. 229–234.
Tsolas, N., et al.: *Performance ND Overload Considerations When Introducing in into an Existing Network,* International Zurich Seminar on Digital Communications Intelligent networks and Their Applications, Jan. 1, 1992, pp. 407–414.
*Methods to Synchronize The in SCP's Overload Protection Mechanism,* Conference: Intelligent networks 7 New Technology Proceedings of the IFIP Conference, 1996, pp. 155–174.
*Congestion Control for Intelligent Networks,* Computer Networks and ISDN Systems, Jan. 1994, vol. 26(5), pp. 511–524.
*Analysis of Congestion Control Mechanisms in an Intelligent Network,* International Journal of Network management, Jan.–Feb. 1998, vol. 8(1), pp. 18–41.

(List continued on next page.)

Primary Examiner—Fan Tsang
Assistant Examiner—Md Shafiul Alam Elahee
(74) Attorney, Agent, or Firm—Kirschstein, et al.

(57) ABSTRACT

In a telecommunications network which comprises an Intelligent Network (IN), Call-Gapping is implemented in a call control function (CCF), so that calls are selectively discarded automatically in order to reduce the load on the IN. As the CCF is the point at which an incoming call is first recognized as an IN call, this arrangement reduces processing resources consumed by discarded calls and also provides for a faster IN call rejection response.

11 Claims, 1 Drawing Sheet

OTHER PUBLICATIONS

*Performance Simulation of Congestion Control Mechanisms for Intelligent Networks,* International Zurich Seminar on Digital Communications Intelligent Networks and Their Application, 1992, pp. F2/1–16.

*Performance Evaluation of a Multiprocessor SCP,* Conf: IEEE Network Workshop in 97 Meeting the Challenges of Converging Networks and Global Demand, 1996, vol. 3, p. 16.

*Intelligent Network Congestion Control Strategies & Their Impact,* Conf: Australian Telecommunication Networks 7 Applications 1994, vol. 2, pp. 627–632.

*Effective Overload Prevention and Control for Traffic Management in Intelligent Network,* Conf: $4^{th}$ International Conference on Intelligence in Networks ICIN 96, Proc 1996, pp. 229–234.

*The Adaptive Resource Assignment & Optimal Utilization of Multi–Service SCP,* Conf: $4^{th}$ International Conference on Intelligence in Networks ICIN 96, Proc 1996, pp. 235–240.

*Transient 7 Stationary Investigations of Overload Control in Intelligent Networks,* Conf: Information Highways for a Smaller World 7 Better Living Proc of ICCC 95, pp. 602–607.

*Congestion Control for Intelligent Networks,* International Zurich Seminar on Digital Communications Intelligent networks & Their Application, 1992, pp. F1/1–5.

*Performance & Overload Considerations When Introducing in into an Existing Network,* International Zurich Seminar on Digital Communication Intelligent networks 7 Their Application, 1992, pp. F2/1–8.

* cited by examiner

OVERLOAD PREVENTION IN AN INTELLIGENT NETWORK

BACKGROUND OF THE INVENTION

The current invention relates to Telecommunication Networks of a kind which comprises an Intelligent Network and the management of call congestion therein.

Operators of telecommunication networks are continually seeking to provide enhanced functionality for users. Introduction of Intelligent Networks (IN) has significantly improved the flexibility and range of features available to the user.

Intelligent Network is a term for a public network architecture which has been adopted internationally. By changing the relationship of the basic call (i.e. a person to person telephone call) to added value services (e.g. call waiting, three party call, etc.) it has been possible to separate off the features and provide them separately within the network and to provide a defined interface between the basic call and the added value services. Within the IN architecture, the services are provided in a separate physical entity within the network known as a service control point or SCP which influences the progress of a call which is contained within the service switching point or SSP.

The SSP comprises a service switching function (SSF) and a call control function (CCF). In conventional networks, incoming calls to the IN arrive at the CCF. If the CCF can handle the IN call it passes an initiating message to the SSF.

Most IN implementations within a telecommunications network are as overlayed networks which are connected to the traffic sources by signalling system number 7 (SS7) interfaces.

A known problem in IN occurs when the rise in traffic volume for a particular IN service temporarily reduces the capacity for other IN services. For example, if an unscheduled mass-call event occurs to a particular IN service the result can be that incoming routes are swamped rendering them unavailable to support other traffic. A known solution to this problem is Call-Gapping. The known Call-Gap operation according to the current standards involves operation by the CCF in receiving the incoming call and passing it to the associated SSF which then processes the call further. If Call-Gapping is enabled either a proportion of all incoming calls, or a proportion of all calls from a particular source are discarded by the IN at the SSF during periods of traffic congestion. The International Telecommunications Union (ITU) has issued telecommunications standards (ITU-T) specifying capability set one (CS.1) and capability set two (CS.2) which both support Call-Gap operation in an IN.

SUMMARY OF THE INVENTION

The following publications disclose various aspects of all automatic call gapping in an intelligent network and in particular call gapping in the SSP under control of the SCP: EP-A-O 735 786; JEONG K-J ET AL: 'Effective Overload Prevention and Control for Traffic Management in Intelligent Network', International Conference on Intelligent Networks 1 Jan. 1996; TSOLAS ET AL, 'Performance and overload considerations when introducing IN into an existing network', International Zurich Seminar on Digital Communications networks and their Applications', 1 Jan. 1992; WO 96 15634 A.

An object of the present invention is to reduce the IN processing resources consumed by Call-Gapping operations.

A further object of the invention is to provide a faster IN call rejection response.

The invention provides a telecommunications network comprising an Intelligent Network (IN) wherein the network is arranged to perform an automatic Call-Gapping operation at a point at which an incoming call to the IN is recognised as IN call wherein the IN comprises a Call Control Function (Ce) and wherein the point at which an incoming call to the IN is recognised as an IN call is comprised in the CCF.

An embodiment of the invention will now be described by way of example with reference to the drawings in which:

DETAILED DESCRIPTION OF THE PREFERRED EMBODIMENT

Figure 1:
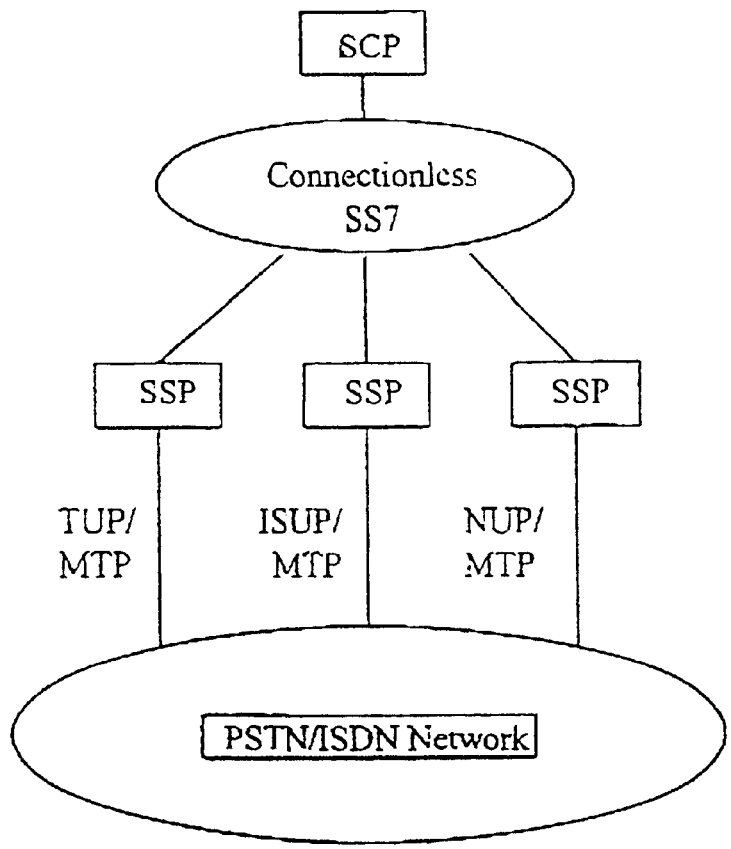
FIG. 1 shows in diagrammatic form a telecommunications network incorporating an Intelligent Network.

Turning to FIG. 1 a typical Intelligent Network to which the present invention may be applied comprises a service control point (SCP) which may be connected to one or more service switching points (SSP) via a connectionless SS7 network. The SSPs may be connected to further SSPs (not shown) via additional SS7 links and ultimately to the source or destination of a call.

Figure 2:
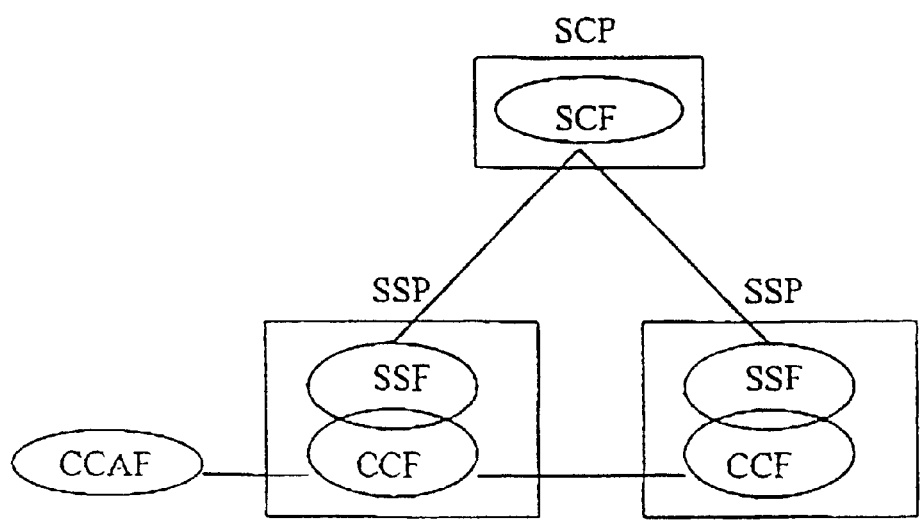
FIG. 2 shows a block diagram illustrating the interrelationship of functional blocks within the Intelligent Network of FIG. 1.

Referring to FIG. 2, the SCP contains a service control function (SCF) which oversees call control functions in the processing of IN service requests. In particular, the SCF interfaces and interacts with service switching functions (SSF) located in the SSPs. Also in the SSPs, the CCFs provide call/service processing and control: in particular all incoming and outgoing calls are controlled by the CCFs. The SSF associated with the CCF provides the set of functions required for interaction between the CCF and the SCF.

The behaviour of IN calls is controlled by service logic (SLP) in the SCF. The service logic is invoked by a message, triggered by the CCF, from the SSF to the SCF. A dialogue is established between the SSF and SCF to achieve correct handling of the IN call in the SSP.

In addition, known arrangements may allow some manual Call-Gapping at the CCF under control of an operator via the Man-Machine Interface (MMI).

When an IN service is invoked, the dialled digits used to invoke the service are part of a network numbering plan (ITU standard E. 164 sets out a suitable definition). Recognition of the dialled digits will cause routing switches to connect the call to the appropriate SSP. On recognising the dialled digits the SSP will query an associated SCF. ITU-T Standards (ITU-T Q1214-1218: (IN CS.1), ITU-T Q122X (IN CS.2), ETS 300 374-1:1994 (CS.1 Core INAP)) provide operations for this purpose. The SCF will respond to control the behaviour of the querying SSP and to determine the treatment of the IN call. If the SCF is in overload, or the service load is too high, it can send a Call-Gap instruction to the originating SSP to reduce the number of calls handled for that service. In the arrangement of the prior art, the appropriate SSF then reacts by discarding incoming calls on a selective basis.

As shown in FIG. 1, the IN services are usually carried to the SSP over trunk routes variously using telephony user part (TUP), national user part (NUP) or ISDN user part (ISUP) over message transfer part (MTP) as defined in the relevant national and international standards (i.e. ITU-T Q721-725; BTNR 167; ITU-T Q761-764 and ITU-T Q701-707, respectively). Where these routes carry a mixture of different IN services, they are distinguishable by the service key or dialled digits in the numbering plan used. Increased traffic for a particular IN service can temporarily reduce the capacity for other IN services and can temporarily render incoming routes on the SSP unavailable to support other traffic.

According to the present invention Call-Gapping is executed at the point where the incoming call is recognised as an IN call, i.e. corresponding to where the call enters the IN. In the present embodiment this point corresponds to the incoming side of the CCF. This point is illustrated diagrammatically in FIG. 2 by the point where the line joining the CCAF to a CCF touches the CCF.

When the SCP detects a traffic load in excess of a certain level it automatically issues an instruction to initiate a Call-Gap operation to the originating SSP. When the Call-Gap operation instruction is received by the SSP from the SCP, the appropriate SSF in the SSP passes the instruction to the receiving CCF within the same SSP for automatic implementation of Call-Gapping on the incoming traffic routes. Thus automatic Call-Gapping is implemented at the CCF.

The more efficient implementation of the present invention thereby causes execution of the Call-Gap operation in the CCF before the call is passed to the SSF.

In order to achieve this the following steps are implemented:

Modification to the SSF to pass the IN Call-Gap message to the CCF. There may have to be some transformation of the message to the syntax used by the CCF.

Modification to the CCF to accept the Call-Gap operation, act upon it and send an acknowledgement message back to the SSF.

Modification to the exchange MMI to provide commands to allow IN Call-Gapping to be operational with priority given to manual Call-Gapping.

Provision of statistics on the operation of the Call-Gapping.

In addition, management commands shall be available at the SSP to generate a report on the active Call-Gap operations.

activate and de-activate Call-Gap operations. This taking precedence over operations sent by the SCPs.

allow and disallow execution of Call-Gap operations received by the SSP.

A particular implementation of this concerns incoming IN calls signalled over Signalling System No. 7 interfaces to the SSP. At the point of recognising the IN call by the Call Control Function, if the Call-Gapping operation is active, incoming calls will be selectively discarded by the CCF. The Call Control Function will normally be an "MTP Users part" as defined in ITU-T Q700.

What is claimed is:

1. A telecommunications network comprising an Intelligent Network (IN) wherein the network is arranged to perform an automatic Call-Gapping operation at a point at which an incoming call to the IN is recognized as an IN call wherein the IN comprises a Call Control Function (CCF) and wherein the point at which an incoming call to the IN is recognized as an IN call is comprised in the CCF.

2. The telecommunications network of claim 1 wherein the SCP comprises a Service Control Function (SCF) and the network is arranged to transmit a Call-Gap instruction from the SCF to the CCF.

3. The telecommunications network of claim 2 wherein the IN also comprises a Service Switching Point (SSP), the SSP comprising the CCF and a Service Switching Function (SSF) wherein the SSF is arranged to pass the Call-Gap instruction from the SCF to the CCF.

4. The telecommunications network of claim 3 wherein the CCF is arranged to receive the Call-Gap instruction, to carry out the instruction and to send an acknowledgement back to the SSF.

5. The telecommunications network of claim 1 in which the CCF is adapted to perform Call-Gapping operations both initiated automatically and manually.

6. The telecommunications network of claim 3 in which a Call-Gapping operation is performed on a call in the SSP without the call reaching the SSF.

7. A method for Call-Gapping in an Intelligent Network (IN) comprised in a telecommunications network, the method comprising an automatic Call-Gapping operation wherein the automatic Call-Gapping operation is performed at a point where an incoming call to the IN is recognized as an IN call wherein the IN comprises a Call Control Function (CCF) and wherein the point at which an incoming call to the IN is recognized as an IN call is comprised in the CCF, wherein the IN comprises a Service Control Point (SCP) and wherein the automatic Call-Gapping operation is performed by the CCF, under control of the SCP.

8. The method according to claim 7 wherein the SCP also comprises a Service Control Function (SCF), the method also comprising the step of the SCF notifying the CCF that Call-Gapping is required.

9. The method according to claim 8 wherein the IN also comprises a Service Switching Function (SSF) and a Service Switching Point (SSP), the SSF and the CCF being comprised in the SSP, the method also comprising the step of the SSF passing the Call-Gapping notification from the SCF to the CCF.

10. The method according to claim 8 comprising the steps of the SCF determining the current load condition of a local part of the IN and, where the load condition is above a certain level, the SCF automatically notifying the CCF that Call-Gapping is required.

11. The method according to claim 9 wherein an IN call is rejected by the CCF, without the call reaching the SSF.

* * * * *